(12) United States Patent
Johnson et al.

(10) Patent No.: US 9,231,956 B1
(45) Date of Patent: Jan. 5, 2016

(54) UTILIZING ENTITY-GENERIC RECORDS FOR DETERMINING ACCESS TO ASSETS

(71) Applicant: EMC Corporation, Hopkinton, MA (US)

(72) Inventors: Matt Johnson, Ridgewood, NY (US); Adam Young, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 273 days.

(21) Appl. No.: 13/800,534

(22) Filed: Mar. 13, 2013

(51) Int. Cl.
*G06F 21/62* (2013.01)
*H04L 29/06* (2006.01)

(52) U.S. Cl.
CPC .......... *H04L 63/102* (2013.01); *G06F 21/6218* (2013.01); *G06F 21/6236* (2013.01); *H04L 63/10* (2013.01)

(58) Field of Classification Search
CPC . G06F 21/6218; G06F 21/6236; H04L 63/10; H04L 63/102
See application file for complete search history.

(56) References Cited

U.S. PATENT DOCUMENTS

| | | | |
|---|---|---|---|
| 6,895,512 B1* | 5/2005 | Calbucci | 726/3 |
| 2002/0184521 A1* | 12/2002 | Lucovsky et al. | 713/200 |
| 2003/0154401 A1* | 8/2003 | Hartman et al. | 713/201 |
| 2003/0217122 A1* | 11/2003 | Roese et al. | 709/219 |
| 2004/0243822 A1* | 12/2004 | Buchholz et al. | 713/200 |
| 2005/0015621 A1* | 1/2005 | Ashley et al. | 713/201 |
| 2005/0132224 A1* | 6/2005 | Estrada et al. | 713/201 |
| 2005/0138420 A1* | 6/2005 | Sampathkumar et al. | 713/201 |
| 2006/0074915 A1* | 4/2006 | Bhandarkar et al. | 707/9 |
| 2010/0257605 A1* | 10/2010 | McLaughlin et al. | 726/23 |
| 2013/0173408 A1* | 7/2013 | Lindblom | 705/26.1 |
| 2013/0326220 A1* | 12/2013 | Connelly et al. | 713/168 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Robert Leung
(74) *Attorney, Agent, or Firm* — Ryan, Mason & Lewis, LLP (57) ABSTRACT

A method comprises the following steps. Entity-generic user records are created for a plurality of users associated with a plurality of entities by analyzing entity-specific user records for the plurality of users, wherein the entity-generic user records comprise respective sets of entitlements for the plurality of users. Entity-generic asset records for assets associated with the plurality of entities are created by analyzing entity-specific asset records for the plurality of assets, wherein the entity-generic asset records comprise respective sets of permissions for accessing the plurality of assets. An entity-generic user record for a given user is utilized to determine whether the given user has access to a given asset by comparing the set of entitlements in the given entity-generic user record with the set of permissions in an entity-generic asset record for the given asset.

20 Claims, 5 Drawing Sheets

UTILIZING ENTITY-GENERIC RECORDS FOR DETERMINING ACCESS TO ASSETS

FIELD

The field relates to information processing, and more particularly to information processing techniques for managing access to assets.

BACKGROUND

Managing access to products and services across a number of entities is a difficult task. For example, various business and other entities may provide products, services and assets to its own employees, to customers and to partners associated with other entities. Managing access to such products, services and assets can be difficult, as various entities may use different attributes, terminology, etc. to define users. In addition, a given business entity may have a number of divisions. Employees associated with each division may be defined using a variety of attributes, terminology, etc.

Often times, a customer service representative or other individual controlling access to a given product, service or asset must spend a significant amount of time and resources to determine whether specific customers, partners or employees should or should not have access to the given product, service or asset. This leads to inefficiencies, waste, reduced productivity, and inconveniences for the customer service representative and the customer, partner or employee.

SUMMARY

Embodiments of the present invention provide techniques for managing access to assets by utilizing entity-generic records.

For example, in one embodiment, a method comprises the following steps. Entity-generic user records are created for a plurality of users associated with a plurality of entities by analyzing entity-specific user records for the plurality of users, wherein the entity-generic user records comprise respective sets of entitlements for the plurality of users. Entity-generic asset records for assets associated with the plurality of entities are created by analyzing entity-specific asset records for the plurality of assets, wherein the entity-generic asset records comprise respective sets of permissions for accessing the plurality of assets. An entity-generic user record for a given user is utilized to determine whether the given user has access to a given asset by comparing the set of entitlements in the given entity-generic user record with the set of permissions in an entity-generic asset record for the given asset. The creating entity-generic user records, the creating entity-generic asset records and utilizing steps are performed by at least one processing device.

In another embodiment, an apparatus comprises a user entitlements module, an asset permissions module and an access module. The user entitlements module is configured to create entity-generic user records for a plurality of users associated with a plurality of entities by analyzing entity-specific user records for the plurality of users, wherein the entity-generic user records comprise respective sets of entitlements for the plurality of users. The asset permissions module is configured to create entity-generic asset records for assets associated with the plurality of entities by analyzing entity-specific asset records for the plurality of assets, wherein the entity-generic asset records comprise respective sets of permissions for accessing the plurality of assets. The access module is configured to utilize an entity-generic user record for a given user to determine whether the given user has access to a given asset by comparing the set of entitlements in the given entity-generic user record with the set of permissions in an entity-generic asset record for the given asset. Each of the user entitlements module, the asset permissions module and the access module is implemented in a processing device.

In yet another embodiment, a system comprises a plurality of clients, a plurality of application servers and an entitlement server comprising a processor coupled to memory. The entitlement server being configured to create client-generic records for a plurality of users associated with the plurality of clients by analyzing client-specific records for the plurality of users, create application-generic records for a plurality of applications associated with the plurality of application servers by analyzing application-specific records for the plurality of applications, utilize a given client-generic record for a given user associated with a given client to determine whether the given user has access to a given application by comparing the set of entitlements in the given client-generic record with the set of permissions in an application-generic record for the given application. The entity-generic records comprise respective sets of entitlements for the plurality of users and the application-generic records comprise respective sets of permissions for accessing the plurality of applications.

Advantageously, embodiments of the invention described herein serve to align user and asset records for a plurality of entities in a unified system, reducing service costs and waste for the plurality of entities while increasing security. Furthermore, embodiments of the invention provide individuals associated with the plurality of entities insight into entitlement and permission information.

These and other features and advantages of the present invention will become more readily apparent from the accompanying drawings and the following detailed description.

DETAILED DESCRIPTION

Embodiments of the invention will be described herein with reference to exemplary methods, systems and devices. It is to be appreciated, however, that the invention is not restricted to use in the particular illustrative methods, systems and devices described below, but instead may be used with a wide variety of other methods, systems, and devices.

Management of entitlements and permissions can be a difficult task for entities, as various entities may use different user profiling systems which define entitlements and permissions in a variety of ways.

The term "entitlements" as used herein is intended to refer to a level of access associated with a user, individual, entity, etc. A given entitlement may comprise a set of factors that determine whether a given user has access to content, tools, documents, products, services and other assets.

The term "permissions" as used herein is intended to refer to a level of access required to access an asset. A given permission may comprise a set of factors which specify the required entitlements for accessing a given asset.

The term "entity" as used herein is intended to refer to a business, organization, group, government, body, association, or a division or sub-group thereof, etc.

A given entity may provide a number of services and products to its employees, customers and other entities. For example, a partner A may offer a product X to partners B and C. Partner B may have a number of users with user profiles or records defined by partner B, and partner C may have a number of users with user profiles or records defined by partner C. Partner A, however, may define access to the product X using an asset record defined by partner A. The process of determining whether a given user of partner B has access to product X offered by partner A can be a complicated task. For example, partner B may define users according to their geographic location and an access level of gold, silver or bronze. Partner A, however, may specify that access to product X is restricted to users in geographic area with an access level of first class or second class.

As an example, assume that a given user associated with partner B has a geographic location of North America and a silver access level, while the product X associated with partner A specifies a geographic access area of the United States and a first class access level. As is readily apparent, when the partner A receives a request from the given user for the product X, it is difficult to determine from their respective user profiles or records whether the given user should be given access to the product X. For example, the partner A must determine whether the silver access level of partner B is analogous to the first class access level of partner A. As another example, the partner A must determine whether the geographic location of North America is sufficient to access a product which specifies a geographic access area of the United States. If the product X comprises media content which the partner A is only authorized to distribute in the United States, the given user with a location of North America may not necessarily be authorized to access the product X.

The partner A may also use different attributes and factors to set permissions for two different products X and Y. Thus, even if a partner B were to conform its user profiles to attributes recognizable with those used for product X offered by partner A, there still may be issues for accessing product Y. If the partners A and B were to use the same attributes or factors for respective user profiles and asset profiles, other issues may arise. For example, a partner A may label a given user as a support partner, while the partner B may use a different label for the given user such as a customer service representative. When determining whether the given user has access to a given product, service or other asset, a determining must be made as to whether the labels used by partner A and partner B for similar factors are equivalent, which can be difficult and time consuming.

One technique for solving several of the above issues is to combine the set of permissions for a given asset and encapsulate it within a given permission code. For example, a product X may have a permission code relating a set of attributes or entitlements which have permission to a given asset. For example, a given product X may have an arbitrary code comprising a four-digit number such as 1033 associated therewith. This code may correspond to permissions which require a user to be in one of a group of entities, some specified geographical areas defined by the group of entities, and some specified access levels defined by the group of entities. A given product Y, however, may have all of the same permissions as product X except that a particular partner C is not entitled to access product Y. As such, the code for product Y may be another arbitrary four-digit number 1047. Thus, large entities with a plurality of product and other service offerings to a number of customers, employees, partners, etc. can end up using a very large number of non-overlapping codes. It can be difficult for both customer service representatives of the serving entity, and customers, employees, partners, etc. to determine why they do or do not have access to a given asset based on the codes.

The above-described techniques have a number of drawbacks, including increased customer service and support costs, delay and frustration for end users, wasted time and productivity, etc. In addition, several of the above-described techniques may lead to end-users and customer service representatives using various workarounds which comprise the overall security of a given entity. For example, a given customer service representative for an entity may receive a support call from an end user attempting to find out why he/she is unable access a given product or service. The customer service representative may have difficulty determining exactly why the end user is unable to access the given product or service, and may mistakenly give the end user access to the given product or service, due to confusion in the entitlements and permissions or due to pressures and/or deadlines from the end user.

Accordingly, a need exists for techniques which align user and asset records for a plurality of entities in a unified system. Embodiments of the invention, as will be described below, address these and other needs by providing various features and advantages relative to conventional techniques for managing access to assets.

Figure 1:
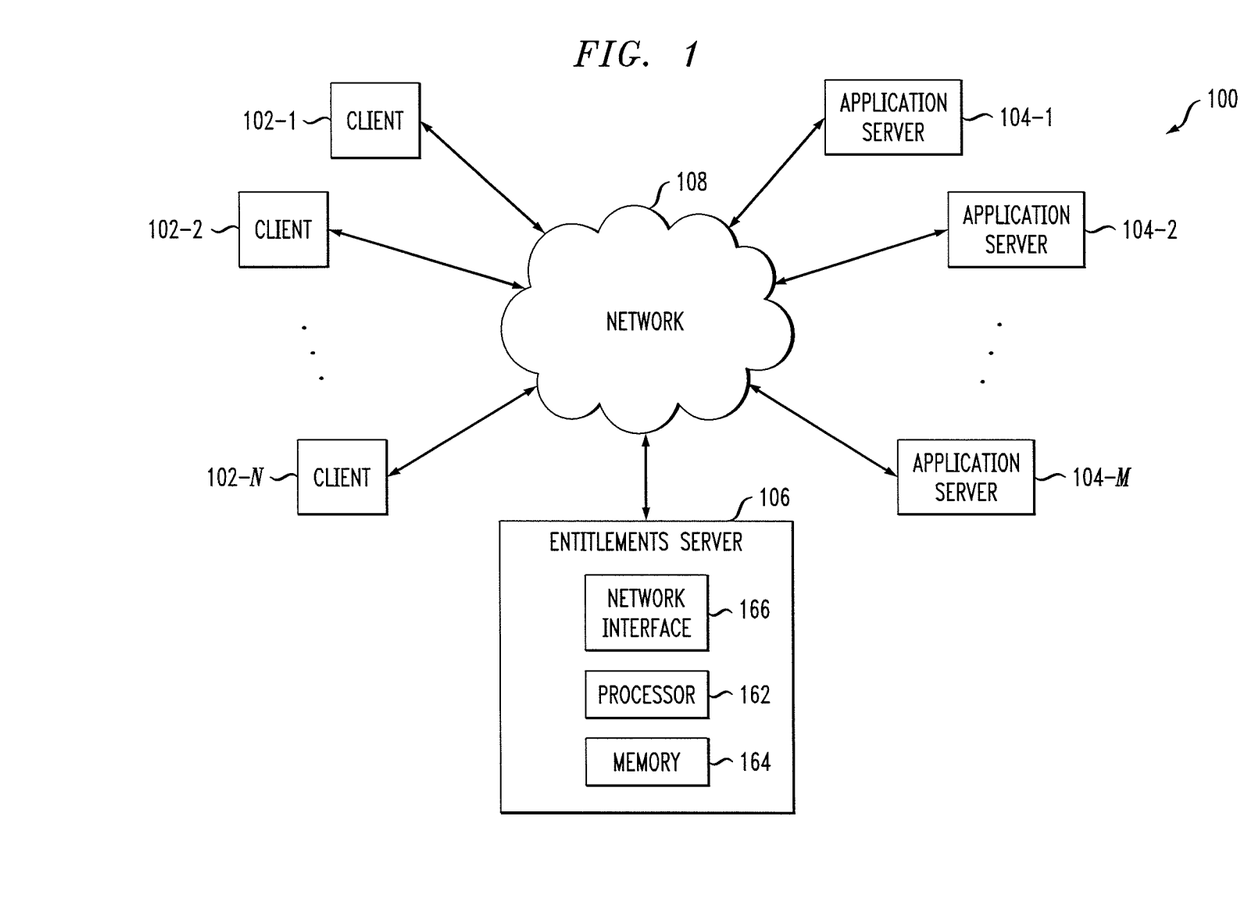
FIG. 1 is a simplified block diagram of an exemplary communication system, according to an embodiment of the invention.

FIG. 1 shows a communication system 100 comprising a plurality of clients 102-1, 102-2, . . . 102-N that are configured to communicate with a plurality of application servers 104-1, 104-2, . . . 104-M and an entitlements server 106, over a network 108.

The clients 102 may comprise processing devices utilized by end users of a product, service or application to access assets on one or more of the application servers 104. The clients 102 may comprise personal computers, laptops, mobile telephones, tablets, or various other computing devices. Each of the clients 102 may be associated with a different entity, or two or more of the clients may be associated with the same entity. Similarly, the application servers 104 may be associated with one or more different entities. One or more of the clients 102 and one or more of the application servers 104 may be associated with a same entity.

It is important to note that the application servers 104 in FIG. 1 need not necessarily provide an "application" to end users such as clients 102. Instead, application servers 104 may be configured to provide any number of or combination of assets such as products, services, information, etc. Assets may include cloud services, such as virtualized data storage platform products and services, network storage products and services, enterprise storage products and services, etc.

Entitlements server 106 comprises a processor 162, a memory 164 and a network interface 166. The processor 162 may comprise a microprocessor, a microcontroller, an application-specific integrated circuit (ASIC), a field programmable gate array (FPGA) or other type of processing circuitry, as well as portions or combinations of such circuitry elements.

The memory 164 may be viewed as an example of what is more generally referred to herein as a "computer program product." A computer program product comprises a processor-readable storage (non-transitory) medium having encoded therein executable code of one or more software programs. Such a memory may comprise electronic memory such as random access memory (RAM), read-only memory (ROM) or other types of memory, in any combination. The computer program code when executed by a processing device such as the entitlements server 106 causes the device to perform functions associated with one or more of the elements of system 100. One skilled in the art would be readily able to implement such software given the teachings provided herein. Other examples of computer program products embodying embodiments of the invention may include, for example, optical or magnetic disks.

The network interface 166 comprises circuitry and other elements used to interface the entitlements server 106 with the network 108 and other system components. Such circuitry may comprise conventional transceivers of a type well known in the art.

While not explicitly shown in FIG. 1, the clients 102 and application servers 104 may similarly comprise processors, memory and network interfaces similar to the processor 162, memory 164 and network interface 166 described above.

The communication system 100 shown in FIG. 1 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, clients, application servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

The phrases "communication system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Furthermore, it is to be appreciated that the communication system 100, or portions thereof, may comprise virtual machines (VMs) implemented using a hypervisor. A hypervisor is an example of what is more generally referred to herein as "virtualization infrastructure." The hypervisor runs on physical infrastructure. For example, the entitlements server 106, clients 102 and applications servers 104 may be implemented using virtualization infrastructure provided as one or more cloud services. The cloud services thus run on respective ones of the virtual machines under the control of the hypervisor. The entitlements server 106, clients 102 and application servers 104 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the system 100 in one or more embodiments of the invention is the VMware® VSphere™ which may have an associated virtual infrastructure management system such as the VMware® VCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement at least a portion of the cloud services.

Figure 2:
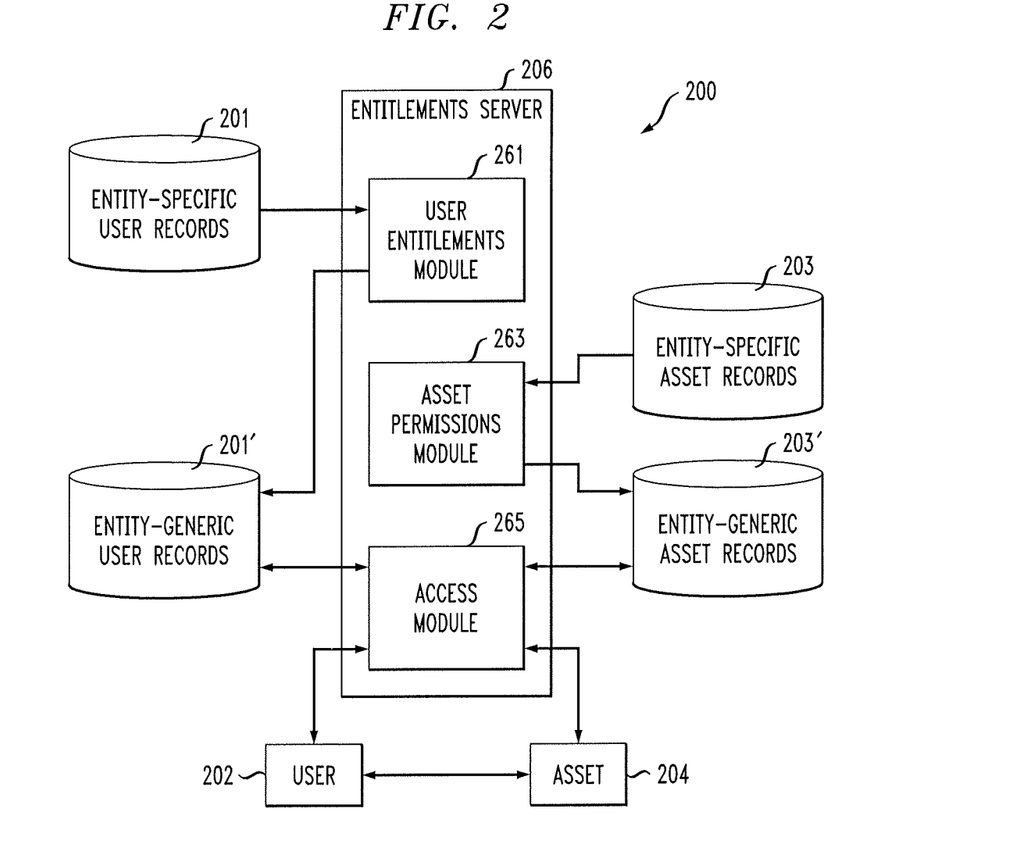
FIG. 2 illustrates an exemplary communication system, according to an embodiment of the invention.

FIG. 2 illustrates a communication system 200 for use in managing access to assets by a plurality of users. The communication system 200 includes a user 202, an asset 204, and an entitlements server 206. The user 202 may be a given one of the clients 102 in FIG. 1, the asset 204 may be a given one of the application servers 104 in FIG. 1 and the entitlements server 206 may be the entitlements server 106 in FIG. 1. While FIG. 2 shows only a single user 202 and a single asset 204 for clarity, the system 200 may include multiple users and assets.

Entitlements server 206 comprises a user entitlements module 261, an asset permissions module 263 and an access module 265. The user entitlements module 261 is configured obtain information regarding entity-specific user records from a database 201 and create corresponding entity-generic user records to store in an entity-generic user records database 201'. The entity-specific and entity-generic user records may comprise sets of entitlements for a plurality of users or groups of users.

The asset permissions module 263 is configured obtain information regarding entity-specific asset records from a database 203 and create corresponding entity-generic user records to store in an entity-generic asset records database 203'. The entity-specific and entity-generic asset records may comprise sets of permissions for a plurality of assets or groups of assets.

While FIG. 2 shows separate entity-specific and entity-generic user record databases 201 and 201' and separate entity-specific and entity-generic asset record databases 203 and 203', embodiments of the invention do not require separate databases for entity-specific and entity-generic information. Instead, both the entity-specific and entity-generic user or asset records may be stored in a single database. In addition, while FIG. 2 shows separate databases for asset and user records, in some embodiments the entity-specific and/or entity generic databases for asset and user records may be combined.

FIG. 2 shows only a single source database and a single destination database for the entity-specific and entity-generic user and asset records. Embodiments of the invention, however, are not limited to this arrangement. For example, the user entitlements module 261 may be configured to create entity-generic user records for entity-specific user records stored in a plurality of databases, wherein each of the plurality of databases corresponds to one of or a group of entities. Similarly, the asset permissions module 263 may be configured to create entity-generic asset records for entity-specific asset records stored in a plurality of databases, wherein each of the plurality of databases corresponds to one of or a group of entities. As another example, the entity-specific asset records and entity-specific user records for a given entity or group of entities may be stored in a single database. One skilled in the art will readily appreciate that various other storage arrangements for the entity-generic and entity-specific user and asset records may be used.

In addition, while FIG. 2 shows the entity-specific and entity-generic user record databases 201 and 201' as separate from the entitlements server, one or both of these databases may be stored in a memory of the entitlements server 206. Similarly, one or both of the entity-specific asset records 203 and the entity-generic asset records 203' may be stored in a memory of the entitlements server 206.

In some embodiments, the entity-specific and entity-generic records may not be stored in a database at all. Instead, the user 202 may provide an entity-specific user record when attempting to access the asset 204, and the entitlements server 206 may provide the user 202 with a corresponding entity-generic record. Alternatively, the user 202 may provide its entity-specific user record to the asset 204. The asset 204 may provide the entity-specific user record for user 202 and the entity-specific asset record for asset 204 to the entitlements server 206. The entitlements server 206 may create an entity-generic user record for user 202 using the user entitlements module 261 and create an entity-generic asset record for the asset 204 using the asset permissions module 263. The entitlements server 206 may utilize the access module 265 to provide these entity-generic records to the asset 204 and/or the user 202, or may simply inform that asset 204 and/or user 202 whether the user 202 has the requisite entitlements for accessing the asset 204.

The access module 265 is configured to communicate with the user 202 and the asset 204 to determine whether the user 202 has the requisite entitlements corresponding to the required permission for accessing the asset 204. The access module 265 can access the entity-generic user record for the user 202 from the entity-generic user records database 201' and the entity-generic asset record for asset 204 from the entity-generic asset records database 203'. The access module 265 can compare the entitlements in the entity-generic user record for user 202 with the permissions in the entity-generic asset record for the asset 204 and determine whether the user 202 should be permitted access to the asset 204. Advantageously, the entitlements server 206 can be utilized by a user 202 and asset 204 associated with different entities.

In the system 200, the entity-generic user and asset records stored in the entity-generic user records database 201' and the entity-generic asset records database 203', respectively, may be provided to the user 202 and/or asset 204 such that the user 202 and/or asset 204 may view the entitlements and permissions associated with one another and with other users or assets. The entity-generic user records database 201' and the entity-generic asset records database 203' may be stored in a network storage volume, some storage volume or device accessible via a web or other interface, or on a storage volume accessible from a cloud computing platform.

Providing the entity-generic user and assets records to users advantageously allows the users to determine why they are or are not able to access a given asset. For example, one customer support representative at a particular entity may be entitled to access a given asset, while another customer support representative at the entity is not. The other customer support representative may view the entity-generic user record for the customer service representative who does have access to determine which entitlement he/she is missing that a given asset requires and take corrective action. As such, the entity-generic user records and entity-generic asset records may be dynamically updated.

Figure 3:
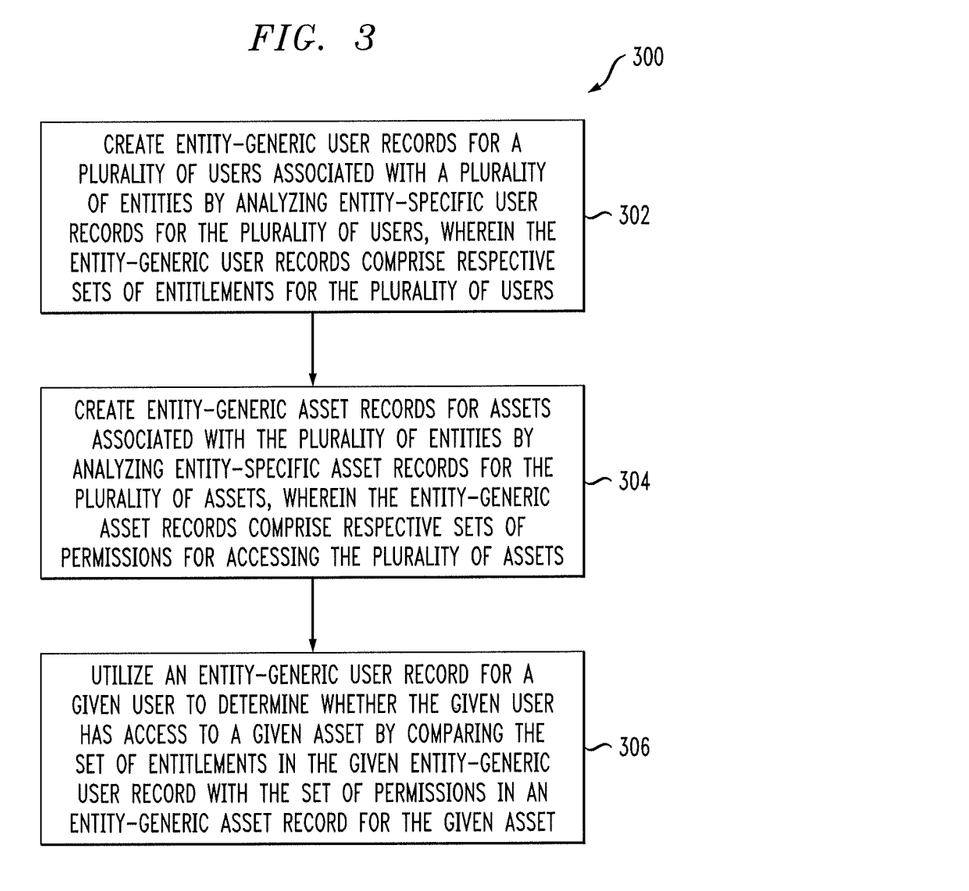
FIG. 3 illustrates a methodology for managing access to assets, according to an embodiment of the invention.

FIG. 3 illustrates a methodology 300 for managing access to assets. Methodology 300 is one example of a methodology that can be performed in accordance with the elements of the system 100 in FIG. 1 or the system 200 in FIG. 2. The methodology 300 begins with step 302, creating entity-generic user records for a plurality of users associated with a plurality of entities by analyzing entity-specific user records for the plurality of users. The entity-generic user records include respective sets of entitlements for the plurality of users.

The methodology 300 continues with step 304, creating entity-generic asset records for assets associated with the plurality of entities by analyzing entity-specific records for the plurality of assets. The entity-generic asset records include respective sets of permissions for accessing the plurality of assets. The plurality of entities in steps 302 and 304 may be the same plurality of entities. Alternatively, at least one entity in the plurality of entities referred to in step 302 may not be in the plurality of entities referred to in step 304, and vice versa.

In step 306, an entity-generic user record for a given user is utilized to determine whether the given user has access to a given asset by comparing the set of entitlements in the given entity-generic user record with the set of permissions in an entity-generic asset record for the given asset. The given user and the given asset may be associated with the same or with different entities. As described above, the different entities may utilize different descriptions for analogous entitlements and permissions.

Figure 4:
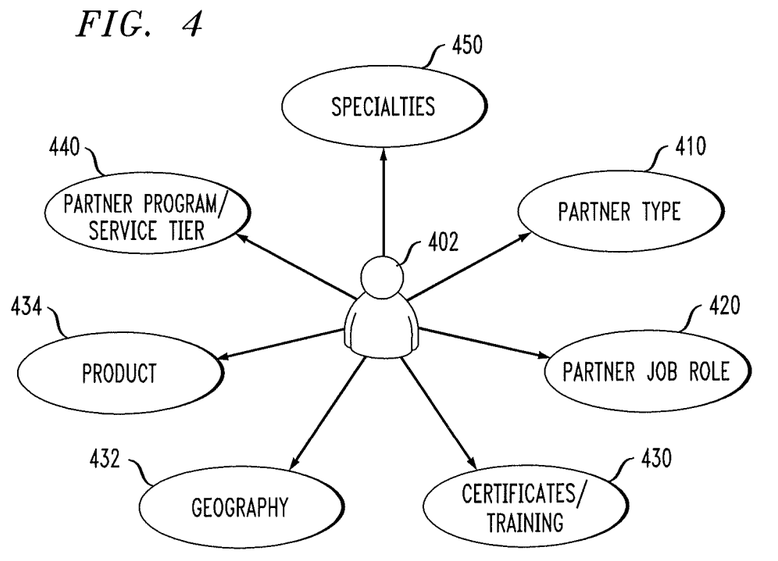
FIGS. 4 and 5 illustrate examples of entity-specific user records, according to an embodiment of the invention.
Figure 5:
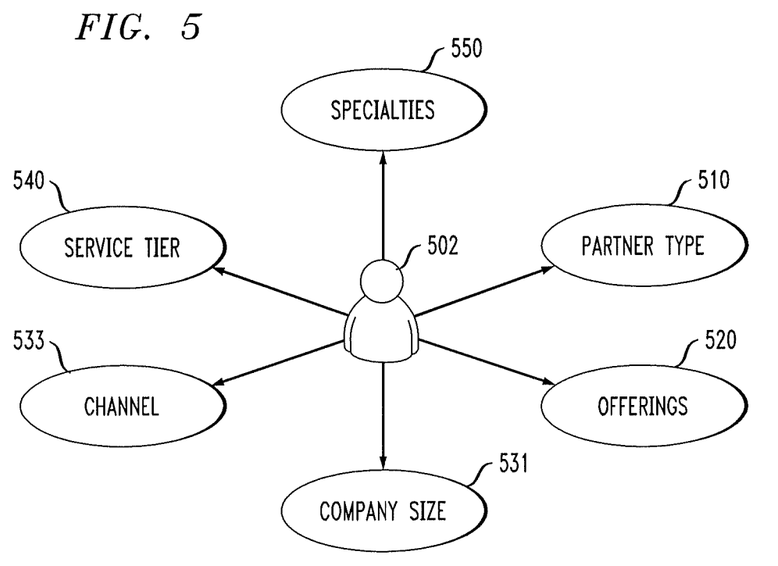

FIGS. 4 and 5 illustrate examples of entity-specific user records from the perspective of two different entities. FIG. 4 shows the factors utilizable for determining the entitlements of a user 402. The factors in FIG. 4 may be from the perspective of a partner entity which obtains products and services from a provider entity. The partner entity may utilize factors such as the partner type 410, partner job role 420, certificates and/or training 430, geography 432, product 434, partner program and/or service tier 440 and specialties 450 to determine the entitlements for the user 402. By way of example, the user 402 may have a partner type 410 of "authorized service partner" and a partner job role 420 of "customer service." The user 402 may have certificates and/or training 430 as a "certified service professional for storage products", a geography 432 of "New York/New Jersey," and a product 434 of "cloud computing storage service Z." The partner program and or service tier associated with user 402 may be "platinum cloud storage service" and the specialty 450 may be "storage consolidation."

FIG. 5 shows corresponding factors for a user 502 from the perspective of the provider entity. The user 502 may be the same as the user 402. The provider entity may use factors such as the partner type 510, offerings 520, company size 531, channel 533, service tier 540 and specialties 550 to define the entitlements for the user 502. By way of example, the partner type 510 may "technical implementation and support" and the offerings 520 may be "services." The company size 531 may represent that number of employees or revenue associated with the partner entity associated with the user 502. The channel 533 may be a "purchase via a distributor" or a "lease via a reseller," etc. The service tier 540 may be "platinum" and the specialties 550 may be "consolidation."

One skilled in the art will readily appreciate that embodiments of the invention are not limited solely to the specific factors shown in FIGS. 4 and 5 or the specific values for these factors given in the examples above. Instead, embodiments of the invention may use a variety of other factors, which may depend in part on the entity or asset types. In addition, while FIGS. 4 and 5 illustrate the differences in entity-specific labeling for user records, different entities may also use different labeling for assets as described herein.

Embodiments of the invention can create entity-generic user records from entity-specific user records. For example, the user entitlements module 261 of the entitlements server 206 in FIG. 2 may take the entity-specific user records associated with the user 402/502 to create a single entity-generic user record for the user 402/502. In some embodiments, the user entitlements module 261 can determine and reconcile relationships between provider and partner-specific attributes to create the entity-generic user record.

By way of example, the user entitlements module 261 may create an entity-generic user record by combining the following factors in the partner and provider specific records shown in FIGS. 4 and 5. The partner type 410 and partner type 510 may combined into a partner program factor. The partner job role 420 and offerings 520 may be combined into a product factor. The partner program/service tier 440 and service tier 540 may be combined into a tier factor. The certificates/training 430, geography 432 and product 434 factors may be combined with the company size 531 and channel 533 factors to form a demographic factor. The specialties 450 and specialties 550 may be combined to form an expertise factor. The asset permissions module 263 may perform a similar process for entity-specific asset records.

It is important to note that embodiments of the invention do not require combination of two entity-specific records for a given user or asset. For example, a given user or asset may have only a single entity-specific record associated therewith, or may have more than two entity-specific records associated therewith.

Figure 6:
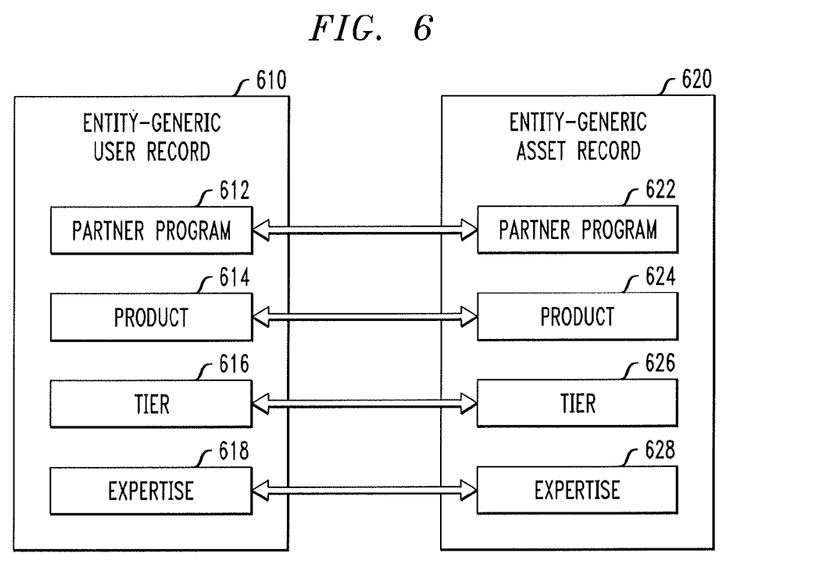
FIG. 6 illustrates an example of entity-generic user and asset records, according to an embodiment of the invention.

FIG. 6 shows an example of entity-generic user and asset records which may be created by the user entitlements module 261 and asset permissions module 263, respectively. The user entitlements module 261 may combine the factors in FIGS. 4 and 5 discussed above to create an entity-generic user record 610 with four factors: partner program 612, product 614, tier 616 and expertise 618 as described above. Similarly, the asset permissions module 263 may combine factors from entity-specific asset records to form entity-generic asset record 620 with four factors: partner program 622, product 624, tier 626 and expertise 628. As discussed above, a given user or asset may have only a single entity-specific record, or more than two entity-specific records which are used to create an entity-generic record for the user or asset.

The access module 265 compares the values of the factors in the entity-generic user record 610 and entity-generic asset record 620 to determine whether a given user has access to a given asset. In some embodiments, the labeling of factors in the entity-generic user and asset records may be chosen to reflect the entity-specific labeling of corresponding entity-specific factors. This advantageously allows users viewing the records to easily determine why they are or are not able to access certain assets.

It is important to note that while FIG. 6 shows entity-generic user record 610 and entity-generic asset record 620 each with the same four factors, the entity-generic user and assets records may include various other factors. In addition, the entity-generic user record and entity-generic asset record may each include one or more factors not included in the other. By way of example, an entity-generic user record may include a demographics factor as described above. The permissions for a given asset, however, may be independent of demographics and thus may not include a demographic factor. Various other factors may be included in one of or both the entity-generic user records and the entity-generic asset records.

The entity-generic user and assets records may be stored as metadata tags. The metadata tags may reflect the attributes and other factors for users and assets which determine the entitlements and permissions. The metadata tags may be edited by an entitlements server such as entitlements server 106 or entitlements server 206 using a cloud-based tagging utility and service. The metadata tags can represent a unifying architectural element across various entities which are readily viewable and transparent such that users and entities can see the entitlements and permissions in the tags. The metadata tags may be organized in an entitlement and permission hierarchy.

Figure 7:
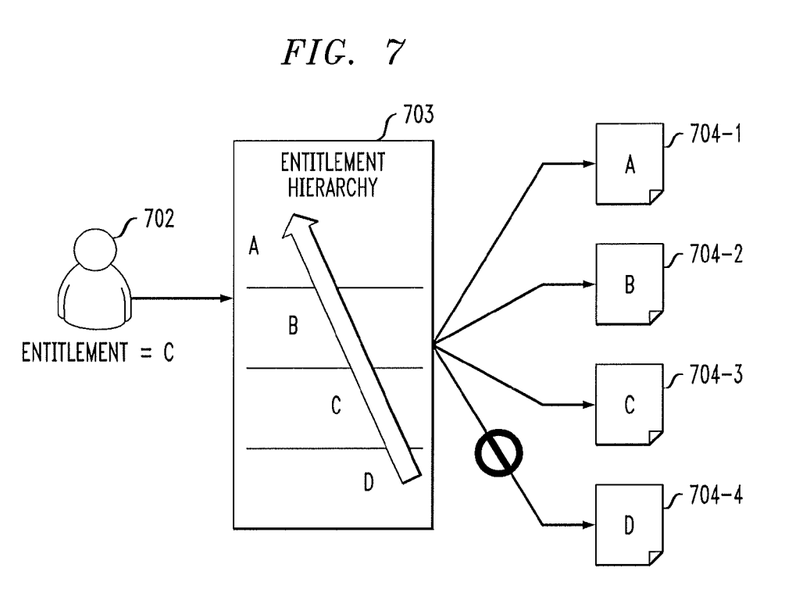
FIG. 7 illustrates an example of an entitlement hierarchy, according to an embodiment of the invention.

FIG. 7 illustrates an example of an entitlement hierarchy 703. A user 702 has an entitlement C. The entitlement hierarchy 703 comprises entitlements A, B, C, D. Entitlements and permissions may be transitive up the hierarchy, such that a user with a specific entitlement may access assets with a permission level corresponding to that entitlement and entitlements in higher levels of the hierarchy. Using this type of hierarchy, general permission at top levels of the hierarchy gradually get more specific as one moves to lower levels of the hierarchy. FIG. 7 shows asset 704-1 with permission level A, asset 704-2 with permission level B, asset 704-3 with permission level C and asset 704-4 with permissions level D. The user 702 with entitlement C can access asset 704-3 with permission level C, as well as assets 704-1 and 704-2 with permission levels A and B, respectively, since these permission levels are higher than the given permission level. The user 702 with entitlement C, however, is unable to access asset 704-4 with permission level D, since the D permission level is below the C permission level.

It is important to note that while FIG. 7 shows an entitlement hierarchy 703 which is transitive "up" the hierarchy, other embodiments may use entitlements hierarchies which are transitive "down" the hierarchy.

It is to be appreciated that the authentication and other processing functionality such as that described in conjunction with the flow diagram of FIG. 3 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of communication systems, information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
creating entity-generic user records for a plurality of users associated with a plurality of entities by analyzing entity-specific user records for the plurality of users, wherein the entity-generic user records comprise respective sets of entitlements for the plurality of users;
creating entity-generic asset records for assets associated with the plurality of entities by analyzing entity-specific asset records for the plurality of assets, wherein the entity-generic asset records comprise respective sets of permissions for accessing the plurality of assets;
utilizing an entity-generic user record for a given user to determine whether the given user has access to a given asset by comparing the set of entitlements in the given entity-generic user record with the set of permissions in an entity-generic asset record for the given asset; and
providing the entity-generic user records and entity-generic asset records to the plurality of users in a transparent manner which allows the plurality of users to view the respective sets of entitlements and permissions;
wherein creating an entity-generic user record for a given one of the plurality of users comprises analyzing two or more different entity-specific user records associated with the given one of the plurality of users, the two or more different entity-specific user records being associated with two or more different entities and utilizing different labels for at least one analogous entitlement; and
wherein the method is performed by at least one processing device comprising a processor coupled to a memory.

2. The method of claim 1, wherein the given user is associated with a first entity and the given asset is associated with a second entity different than the first entity.

3. The method of claim 2, wherein the first entity and the second entity have different sets of entity-specific descriptions for analogous entitlements and permissions.

4. The method of claim 1, wherein the sets of entitlements comprise factors utilizable for determining whether users have access to assets.

5. The method of claim 4, wherein the factors comprise: a product, a geographical location, a level of expertise and a permission level for the product.

6. The method of claim 1, wherein the respective sets of entitlements and permissions comprise attributes which reflect entity-specific descriptions of the attributes.

7. The method of claim 1, wherein the entity-generic user records and entity-generic asset records comprise metadata tags.

8. The method of claim 7, wherein the metadata tags are arranged in a hierarchy comprising a plurality of levels, wherein the entity-generic user records and entity-generic asset records are associated with leaf nodes of the hierarchy.

9. The method of claim 8, wherein entitlements and permissions are transitive up the hierarchy such that a user with a given entitlement level can access assets with a given permission level corresponding to the given entitlement level and one or more permission levels at levels higher than the given permission level.

10. The method of claim 1, further comprising dynamically updating the entity-generic user records and entity-generic asset records.

11. The method of claim 1, further comprising storing the entity-generic user records and entity-generic asset records in a storage volume accessible from at least one cloud computing platform.

12. A non-transitory processor-readable storage medium having instruction code embodied therein which when executed by a processor implements the steps of:
creating entity-generic user records for a plurality of users associated with a plurality of entities by analyzing entity-specific user records for the plurality of users, wherein the entity-generic user records comprise respective sets of entitlements for the plurality of users;
creating entity-generic asset records for assets associated with the plurality of entities by analyzing entity-specific asset records for the plurality of assets, wherein the entity-generic asset records comprise respective sets of permissions for accessing the plurality of assets;
utilizing an entity-generic user record for a given user to determine whether the given user has access to a given asset by comparing the set of entitlements in the given entity-generic user record with the set of permissions in an entity-generic asset record for the given asset; and
providing the entity-generic user records and entity-generic asset records to the plurality of users in a transparent manner which allows the plurality of users to view the respective sets of entitlements and permissions;
wherein creating an entity-generic user record for a given one of the plurality of users comprises analyzing two or more different entity-specific user records associated with the given one of the plurality of users, the two or more different entity-specific user records being associated with two or more different entities and utilizing different labels for at least one analogous entitlement.

13. An apparatus comprising:
a user entitlements module configured to create entity-generic user records for a plurality of users associated with a plurality of entities by analyzing entity-specific user records for the plurality of users, wherein the entity-generic user records comprise respective sets of entitlements for the plurality of users;
an asset permissions module configured to create entity-generic asset records for assets associated with the plurality of entities by analyzing entity-specific asset records for the plurality of assets, wherein the entity-generic asset records comprise respective sets of permissions for accessing the plurality of assets; and
an access module configured to utilize an entity-generic user record for a given user to determine whether the given user has access to a given asset by comparing the set of entitlements in the given entity-generic user record with the set of permissions in an entity-generic asset record for the given asset;
wherein each of the user entitlements module, the asset permissions module and the access module is implemented in a processing device comprising a processor coupled to a memory; and
wherein the access module is further configured to provide the entity-generic user records and entity-generic asset records to the plurality of users in a transparent manner which allows the plurality of users to view the respective sets of entitlements and permissions;

wherein the user entitlements module is configured to create an entity-generic user record for a given one of the plurality of users by analyzing two or more different entity-specific user records associated with the given one of the plurality of users, the two or more different entity-specific user records being associated with two or more different entities and utilizing different labels for at least one analogous entitlement.

14. The apparatus of claim 13, wherein the given user is associated with a first entity and the given asset is associated with a second entity different than the first entity.

15. The apparatus of claim 14, wherein the first entity and the second entity have different sets of entity-specific descriptions for analogous entitlements and permissions.

16. A system comprising:
a plurality of clients;
a plurality of application servers; and
an entitlement server comprising a processor coupled to memory, the entitlement server being configured to;
create client-generic records for a plurality of users associated with the plurality of clients by analyzing client-specific records for the plurality of users, wherein the entity-generic records comprise respective sets of entitlements for the plurality of users;
create application-generic records for a plurality of applications associated with the plurality of application servers by analyzing application-specific records for the plurality of applications, wherein the application-generic records comprise respective sets of permissions for accessing the plurality of applications;
utilize a given client-generic record for a given user associated with a given client to determine whether the given user has access to a given application by comparing the set of entitlements in the given client-generic record with the set of permissions in an application-generic record for the given application; and
provide the client-generic records and the application-generic records to the plurality of users in a transparent manner which allows the plurality of users to view the respective sets of entitlements and permissions;
wherein the entitlement server is configured to create a client-generic record for a given one of the plurality of users by analyzing two or more different client-specific records associated with the given one of the plurality of users, the two or more different client-specific records being associated with two or more different clients and utilizing different labels for at least one analogous entitlement.

17. The system of claim 16, wherein the given client is associated with a first entity and the given application is associated with a second entity different than the first entity.

18. The system of claim 17, wherein the first entity and the second entity have different sets of entity-specific descriptions for analogous entitlements and permissions.

19. The system of claim 16, wherein the entitlement server is configured to store the client-generic records and the application-generic records on a cloud storage volume accessible to the plurality of clients and the plurality of application servers.

20. The method of claim 1, wherein creating an entity-generic asset record for a given one of the plurality of assets comprises analyzing two or more different entity-specific asset records associated with the given one of the plurality of assets, the two or more different entity-specific asset records being associated with two or more different entities and utilizing different labels for at least one analogous permission.

* * * * *